US010995206B2

(12) United States Patent
Herklots et al.

(10) Patent No.: US 10,995,206 B2
(45) Date of Patent: May 4, 2021

(54) COMPOSITION COMPRISING HETEROPHASIC PROPYLENE COPOLYMER

(71) Applicant: SABIC GLOBAL TECHNOLOGIES B.V., Bergen op Zoom (NL)

(72) Inventors: Marc Herklots, Roermond (NL); Yang Fu, Sittard (NL); Ting Huang, Shanghai (CN)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 84 days.

(21) Appl. No.: 15/751,513

(22) PCT Filed: Jul. 14, 2016

(86) PCT No.: PCT/EP2016/066718
§ 371 (c)(1),
(2) Date: Feb. 9, 2018

(87) PCT Pub. No.: WO2017/025268
PCT Pub. Date: Feb. 16, 2017

(65) Prior Publication Data
US 2018/0237624 A1 Aug. 23, 2018

(30) Foreign Application Priority Data

Aug. 10, 2015 (EP) .................................. 15180323

(51) Int. Cl.
*C08L 23/16* (2006.01)
*C08L 23/12* (2006.01)
*C08L 23/08* (2006.01)

(52) U.S. Cl.
CPC ........... *C08L 23/16* (2013.01); *C08L 23/0815* (2013.01); *C08L 23/12* (2013.01); *C08L 2205/03* (2013.01); *C08L 2205/035* (2013.01); *C08L 2207/02* (2013.01)

(58) Field of Classification Search
CPC ...... C08L 23/0815; C08L 23/12; C08L 23/14; C08L 23/16; C08J 2423/08; C08J 2323/12; C08J 2323/14; C08J 2323/16
See application file for complete search history.

(56) References Cited

U.S. PATENT DOCUMENTS

| | | | |
|---|---|---|---|
| 4,282,076 A | 8/1981 | Boynton | |
| 4,399,054 A | 8/1983 | Ferraris et al. | |
| 4,472,524 A | 9/1984 | Albizzati | |
| 5,017,714 A | 5/1991 | Welborn, Jr. | |
| 5,324,820 A | 6/1994 | Baxter | |
| 6,399,707 B1 * | 6/2002 | Meka | C08F 297/08 525/191 |
| 6,930,149 B2 * | 8/2005 | Haerkoenen | C08F 10/06 525/191 |
| 7,279,526 B2 * | 10/2007 | Malm | C08F 10/06 525/191 |
| 2003/0176603 A1 * | 9/2003 | Ommundsen | C08F 210/16 526/90 |

(Continued)

FOREIGN PATENT DOCUMENTS

| | | | | |
|---|---|---|---|---|
| EP | 0063654 A1 | 11/1982 | | |
| EP | 1066958 A1 * | 1/2001 | ............. | B32B 27/32 |

(Continued)

OTHER PUBLICATIONS

Maeder et al., "Influence of n-Alkyl Branches on Glass-Transition Temperatures of Branched Polyethylenes Prepared by Means of Metallocene- and Palladium-Based Catalysts," Macromolecules 33, 1254-1261 (2000).*

(Continued)

*Primary Examiner* — Kregg T Brooks
(74) *Attorney, Agent, or Firm* — Cantor Colburn LLP

(57) ABSTRACT

The invention relates to a composition comprising (A) a heterophasic propylene copolymer and (B) an elastomer of ethylene and α-olefin comonomer having 4 to 8 carbon atoms, wherein the heterophasic propylene copolymer consists of (a) a propylene-based matrix, wherein the propylene-based matrix consists of a propylene homopolymer and/or a propylene copolymer consisting of at least 70 wt % of propylene and at most 30 wt % of ethylene or an α-olefin having 4-10 carbon atoms, based on the total weight of the propylene-based matrix and wherein the propylene-based matrix is present in an amount of 60 to 95 wt % based on the total heterophasic propylene copolymer and wherein the propylene-based matrix has a melt flow index of at least 0.1 dg/min and at most 45 dg/min, measured according to ISO1133 (2.16 kg/230° C.) and (b) a dispersed ethylene-α-olefin copolymer, wherein the dispersed ethylene-α-olefin copolymer is an ethylene-propylene copolymer, wherein the ethylene-α olefin copolymer is present in an amount of 40 to 5 wt % based on the total heterophasic propylene copolymer and wherein the sum of the total amount of propylene-based matrix and total amount of dispersed ethylene-α-olefin copolymer is 100 wt %, wherein the amount of ethylene in the ethylene-α-olefin copolymer of the heterophasic propylene copolymer is from 10 up to and including 45 wt % (RCC2) (B) an elastomer of ethylene and α-olefin comonomer having 4 to 8 carbon atoms wherein the elastomer has a density in the range from 0.88 up to and including 0.907 g/cm3.

18 Claims, No Drawings

(56) References Cited

U.S. PATENT DOCUMENTS

2003/0195299 A1* 10/2003 Stevens ................ B32B 27/32
   525/240
2009/0048399 A1   2/2009 Reijntjens et al.

FOREIGN PATENT DOCUMENTS

| EP | 1344793 A1 | 9/2003 | |
|---|---|---|---|
| EP | 1391482 B1 | 5/2009 | |
| EP | 2423257 A1 | 2/2012 | |
| WO | 2006010414 A1 | 2/2006 | |
| WO | 2012098086 A1 | 6/2012 | |
| WO | 2013010879 A1 | 1/2013 | |
| WO | 2015091151 A1 | 6/2015 | |
| WO | 2015091372 A1 | 6/2015 | |
| WO | WO-2016005301 A1 * | 1/2016 | ............ C08K 3/34 |

OTHER PUBLICATIONS

International Search Report for International Application No. PCT/EP2016/066718; International Filing Date: Jul. 14, 2016; dated Sep. 13, 2016; 3 Pages.

Written Opinion of the International Searching Authority for International Application No. PCT/EP2016/066718; International Filing Date: Jul. 14, 2016; dated Sep. 13, 2016; 5 Pages.

* cited by examiner

COMPOSITION COMPRISING HETEROPHASIC PROPYLENE COPOLYMER

CROSS REFERENCE TO RELATED APPLICATIONS

This application is a 371 of International Application No. PCT/EP2016/066718, filed Jul. 14, 2016, which claims priority to European Application No. 15180323.6 filed Aug. 10, 2015 which are incorporated herein by reference in their entirety.

The invention relates to a composition comprising a heterophasic propylene copolymer, to a process for obtaining such composition and to the use of such composition.

Heterophasic propylene copolymers, also known as impact propylene copolymers or propylene block copolymers, are an important class of polymers due to their attractive combination of mechanical properties, such as impact strength over a wide temperature range and their low cost. These copolymers find a wide range of applications ranging from the consumer industry (for example packaging and housewares), the automotive industry to electrical applications.

Many applications of the heterophasic propylene copolymer require a good combination of optical properties and mechanical properties. One phenomenon which is undesired for many applications is stress whitening, which is the appearance of a white area on an object when a material is stressed by bending or punching operations. The appearance of a white area indicates that there is an onset of failure of the corresponding material. Stress whitening is an aesthetic problem because the white areas can be easily identified by the naked eye.

Attempts to improve optical properties and mechanical properties have been described e.g. in EP1344793 and US200948399. EP1344793 discloses adding a beta-nucleating agent to a heterophasic propylene copolymer for achieving a composition with high impact strength and high gloss. US200948399 discloses a propylene copolymer composition comprising a propylene homopolymer matrix and a propylene copolymer dispersed phase made using a Ziegler-Natta catalyst, which has a transparency higher than 8.

EP1391482 is directed to providing polypropylene compositions with good stiffness/impact balance and high gloss. EP1391482 mentions that for improving the stiffness and/or impact strength, it is known to add classical impact modifiers such as EPR, EOC, SEBS or reactor made heterophasic copolymers, but it is also known to negatively affect surface appearance. EP1391482 solves the problem by providing a composition comprising a heterophasic propylene copolymer and a reactively modified heterophasic copolymer with stabilised phase morphology.

WO2015/091151 discloses a polyolefin composition comprising a first heterophasic propylene copolymer and a second heterophasic propylene copolymer at a weight ratio of 1 to 10.

The first heterophasic propylene copolymer comprises 70-90 wt % of a first polypropylene having a MFI of 55-85 g/10 min and 10-30 wt % of a first ethylene α-olefin copolymer having a MFI of 2.5-5.0 g/10 min.

The second heterophasic propylene copolymer comprises 60-85 wt % of a second polypropylene having a MFI of 50-100 g/10 min and 15-40 wt % of a second ethylene α-olefin copolymer having a MFI of 0.050-0.30 g/10 min. The polyolefin composition may further comprise an ethylene α-olefin copolymer elastomer. The polyolefin composition has reduced tiger stripes.

EP2423257 discloses a polypropylene composition comprising a first heterophasic propylene copolymer, a high melt strength polypropylene, a second heterophasic propylene copolymer, a polyethylene plastomer and a mineral filler.

The first heterophasic propylene copolymer comprises (i) a polypropylene having a MFR2 of 50 to 500 g/10 min and (ii) an elastomeric propylene copolymer having (α) a propylene content of 50 to 80 wt % and (β) an intrinsic viscosity of equal or more than 2.5 dl/g.

The second heterophasic propylene copolymer comprises (i) a random propylene copolymer having a MFR2 of 1 to 40 g/10 min and (ii) an elastomeric propylene copolymer having (α) a propylene content of 50 to 80 wt % and (β) an intrinsic viscosity of equal or below 2.4 dl/g.

WO2015/091372A1 relates to a polypropylene composition for the production of molded articles, such as finished parts, for the automotive industry, has a melt flow rate (230° C., 2.16 kg) of at least 25 g/10 min and comprises (A) 50-95% of a composition having an intrinsic viscosity of the fraction soluble in xylene at 25° C. of 3.0-5.0 dl/g and comprising: (A1) 70-95% of a propylene homopolymer having a polydispersity index (PI) of 4.3-10, a fraction insoluble in xylene at 25° C. higher than 90% and a MFR (230° C., 2.16 kg) of 100-250 g/10 min; (A2) 5-30% of a compolymer of propylene with 36-44% of ethylene-derived units; (B) optionally upt to 45% of a heterophasic propylene polymer, having MFR (230° C., 2.16 kg) of 10-25 g/10 min, flexural modulus higher than 1400 MPa, and comprising 5-20% of a copolymer rubber component and 80-95% of a matrix propylene polymer component; (C) 2-10% of an ethylene based elastoplastic copolymer; and (D) optionally upt to 20% of talc.

WO2013/010879A1 relates to a polyolefin composition comprising (a) a heterophasic propylene copolymer comprising a polypropylene (PP) having a melt flow rate $MFR_2$ (230° C.) of 30 to 350 g/10 min, and an elastomeric propylene copolymer (E) having an intrinsic viscosity (IV) in the range of 1.5 to 3.0 dl/g and (b) a polyethylene having a melt flow rate $MFR_2$ (230° C.) of more than 15 to 200 g/10 min, and (ii) the weight ratio of elastomeric propylene copolymer to the polyethylene is below 2.0.

WO2012/098086A1 relates to a polyolefin composition comprising: a) from 66 wt % to 76 wt % of a propylene polymer having the fraction insoluble in xylene at 25° C., higher than 97 wt %, a polydispersity index lower than 4.5, and a melt flow rate (MFR) determined according to ISO method 1133 (230° C. and 2.16 kg) comprised between 6.0 g/10 min and 10.0 g/10 min, b) from 12 wt % to 20 wt % of a copolymer of ethylene and propylene, the copolymer having an amount of recurring units deriving from ethylene ranging from 40 wt % to 53 wt %, the polymer fraction soluble in xylene at 25 DEG C. having an intrinsic viscosity value ranging from 2 to 4 dl/g; c) from 12% to 20%% of ethylene homopolymer; the sum of the amount of a)+b)+c) being 100; said composition having a value of melt flowrate (MFR) determined according to ISO method 1133 (230° C. and 2.16 kg) ranging from 3.6 to 8.0 g/10 min.

It is an object of the invention to provide a heterophasic polypropylene composition having reduced stress whitening. The level of stress whitening can be expressed by the white spot size and the whiteness of the white spot, which can be determined by the method as described in the examples.

This object is achieved by a composition comprising (A) a heterophasic propylene copolymer and (B) an elastomer of ethylene and α-olefin comonomer having 4 to 8 carbon atoms, wherein the heterophasic propylene copolymer consists of
(a) a propylene-based matrix,
wherein the propylene-based matrix consists of a propylene homopolymer and/or a propylene copolymer consisting of at least 70 wt % of propylene and at most 30 wt % of ethylene and/or an α-olefin having 4-10 carbon atoms, based on the total weight of the propylene-based matrix and
wherein the propylene-based matrix is present in an amount of 60 to 95 wt % based on the total heterophasic propylene copolymer and
wherein the propylene-based matrix has a melt flow index of at least 0.1 dg/min and at most 45 dg/min, measured according to ISO1133 (2.16 kg/230° C.) and
(b) a dispersed ethylene-α-olefin copolymer, wherein the dispersed ethylene-α-olefin copolymer is an ethylene-propylene copolymer, wherein the ethylene-α olefin copolymer is present in an amount of 40 to 5 wt % based on the total heterophasic propylene copolymer and
wherein the sum of the total amount of propylene-based matrix and total amount of dispersed ethylene-α-olefin copolymer is 100 wt %
wherein the amount of ethylene in the ethylene-α-olefin copolymer of the heterophasic propylene copolymer is from 10 up to and including 45 wt % (RCC2)
(B) an elastomer of ethylene and α-olefin comonomer having 4 to 8 carbon atoms wherein the elastomer has a density of 0.850-915 g/cm$^3$, preferably at least 0.865 g/cm$^3$ and at most 0.910 g/cm$^3$.

According to the present invention, it has surprisingly been found that the composition according to the invention shows a good resistance to stress whitening behaviour. This is especially important for application of said composition in the appliance and containers market, since consumers prefer a good appearance of these products.

It has been found according to the invention that the addition of the elastomer (B) to the heterophasic propylene copolymer leads to a large improvement in the impact strength while maintaining stress whitening property, tensile modulus and flexural modulus at acceptable levels. In addition, the composition may have an improvement in transparency.

(A) Heterophasic Propylene Copolymer

Heterophasic propylene copolymers are generally prepared in one or more reactors, by polymerization of propylene in the presence of a catalyst and subsequent polymerization of a propylene-α-olefin mixture. The resulting polymeric materials are heterophasic, but the specific morphology usually depends on the preparation method and monomer ratios used.

The heterophasic propylene copolymers employed in the process according to present invention can be produced using any conventional technique known to the skilled person, for example multistage process polymerization, such as bulk polymerization, gas phase polymerization, slurry polymerization, solution polymerization or any combinations thereof. Any conventional catalyst systems, for example, Ziegler-Natta or metallocene may be used. Such techniques and catalysts are described, for example, in WO06/010414; *Polypropylene and other Polyolefins*, by Ser van der Ven, Studies in Polymer Science 7, Elsevier 1990; WO06/010414, U.S. Pat. Nos. 4,399,054 and 4,472,524. Preferably, the heterophasic propylene copolymer is made using Ziegler-Natta catalyst.

The heterophasic propylene copolymer of the composition of the invention consists of a propylene-based matrix and a dispersed ethylene-α-olefin copolymer. The propylene-based matrix typically forms the continuous phase in the heterophasic propylene copolymer. The amounts of the propylene-based matrix and the dispersed ethylene-α-olefin copolymer may be determined by NMR, as well known in the art.

The propylene-based matrix consists of a propylene homopolymer and/or a propylene-α-olefin copolymer consisting of at least 70 wt % of propylene and up to 30 wt % of ethylene and/or an α-olefin having 4 to 10 carbon atoms, preferably ethylene, for example a propylene-α-olefin copolymer consisting of at least 80 wt % of propylene and up to 20 wt % of ethylene and/or an α-olefin having 4 to 10 carbon atoms, for example consisting of at least 90 wt % of propylene and up to 10 wt % of ethylene and/or an α-olefin having 4 to 10 carbon atoms, based on the total weight of the propylene-based matrix, for example consisting of at least 95 wt % of propylene and up to 5 wt % of ethylene and/or an α-olefin having 4 to 10 carbon atoms based on the total weight of the propylene-based matrix.

The α-olefin in the propylene-α-olefin copolymer is selected from the group ethylene and α-olefins having 4-10 carbon atoms, for example 1-butene, 1-pentene, 4-methyl-1-pentene, 1-hexen, 1-heptene, 1-octene and mixtures thereof, preferably the α-olefin in the propylene-α-olefin copolymer is ethylene.

Preferably, the propylene-based matrix consists of a propylene homopolymer.

The melt flow index (MFI) of the propylene-based matrix (before it is mixed into the composition of the invention), $MFI_{PP}$ is at least 0.1 dg/min and at most 45 dg/min, measured according to ISO1133 (2.16 kg/230° C.). $MFI_{PP}$ may be for example at least 0.2 dg/min, at least 0.3 dg/min, at least 0.5 dg/min, at least 1 dg/min or at least 1.5 dg/min, and/or for example at most 40 dg/min, at most 30 dg/min, at most 25 dg/min or at most 20 dg/min, measured according to ISO1133 (2.16 kg/230° C.).

The propylene-based matrix is present in an amount of 60 to 95 wt %, for example 65 to 85 wt %, for example 70 to 85 wt %, for example 70 to 80 wt %, for example 65 to 75 wt % or 75 to 85 wt % based on the total heterophasic propylene copolymer.

The propylene-based matrix is preferably semi-crystalline, that is it is not 100% amorphous, nor is it 100% crystalline. For example, the propylene-based matrix is at least 40% crystalline, for example at least 50%, for example at least 60% crystalline and/or for example at most 80% crystalline, for example at most 70% crystalline. For example, the propylene-based matrix has a crystallinity of 60 to 70%. For purpose of the invention, the degree of crystallinity of the propylene-based matrix is measured using differential scanning calorimetry (DSC) according to ISO11357-1 and ISO11357-3 of 1997, using a scan rate of 10° C./min, a sample of 5 mg and the second heating curve using as a theoretical standard for a 100% crystalline material 207.1 J/g.

Besides the propylene-based matrix, the heterophasic propylene copolymer also comprises a dispersed ethylene-α-olefin copolymer. The dispersed ethylene-α-olefin copolymer is also referred to herein as the 'dispersed phase'. The dispersed phase is embedded in the propylene-based matrix in a discontinuous form. The particle size of the dispersed phase is typically in the range of 0.05 to 2.0 microns, as may be determined by transmission electron microscopy (TEM).

The MFI of the dispersed ethylene-α-olefin copolymer (before it is mixed with other components of the composition of the invention) (MFI$_{EPR}$) may be for example at least 0.001 dg/min, at least 0.01 dg/min, at least 0.1 dg/min, at least 0.3 dg/min, at least 0.7 dg/min, at least 1 dg/min, and/or for example at most 30 dg/min, at most 20 dg/min, at most 15 dg/min at most 10 dg/min, at most 5 dg/min, The MFI of the dispersed ethylene α-olefin copolymer (MFI$_{EPR}$) is calculated taking into account the MFI of the propylene-based matrix (MFI$_{PP}$), the MFI of the heterophasic propylene copolymer (MFIheterophasic) and rubber content (RC) according to the following formula:

$$MFIEPR = 10 \wedge \left( \frac{\text{Log} \, MFIheterophasic - \text{matrix content} * \text{Log} \, MFIPP}{\text{rubber content}} \right)$$

The dispersed ethylene-α-olefin copolymer is present in an amount of 40 to 5 wt %, for example in an amount of 35 to 15 wt % based on the total heterophasic propylene copolymer, for example in an amount of at least 20 wt % and/or for example in an amount of at most 30 wt % based on the total heterophasic propylene copolymer.

In the heterophasic polypropylene in the composition of the invention, the sum of the total weight of the propylene-based matrix and the total weight of the dispersed ethylene-α-olefin copolymer is 100 wt %.

The amount (in wt %) of ethylene in the ethylene-α-olefin copolymer (also referred to herein as RCC2) is preferably in the range of 10-45 wt % based on the ethylene-α-olefin copolymer. More preferably, the amount of ethylene in the ethylene-α-olefin copolymer is 15-40 wt %, more preferably 15-30 wt %, more preferably 15-25 wt %, even more preferably 18 to 22 wt %.

Such amount of ethylene in the ethylene-α-olefin copolymer leads to a good stress whitening behavior of the composition according to the invention.

For example, the amount of ethylene in the ethylene-α-olefin copolymer is at least 10 wt %, for example at least 15 wt %, for example at least 18 wt % and/or at most 40 wt %, for example at most 30 wt %, for example at most 25 wt %, for example at most 22 wt % based on the ethylene-α-olefin copolymer.

The α-olefin in the ethylene-α-olefin copolymer is propylene. Therefore, the α-olefin in the ethylene-α-olefin copolymer in the composition of the invention is an ethylene-propylene copolymer.

The MFI of the heterophasic propylene copolymer (MFIheterophasic) may be for example at least 0.1 dg/min, at least 0.2 dg/min, at least 0.3 dg/min, at least 0.5 dg/min, at least 1 dg/min or at least 1.5 dg/min, and/or for example at most 50 dg/min, at most 40 dg/min, at most 30 dg/min, at most 25 dg/min, at most 20 dg/min, at most 15 dg/min or at most 10 dg/min, measured according to ISO1133 (2.16 kg/230° C.).

The values of the MFI of the propylene-based matrix (MFI$_{PP}$) and the MFI of the dispersed ethylene-α-olefin copolymer (MFI$_{EPR}$) mentioned herein are understood as the values before the heterophasic propylene copolymer is mixed with component (B) and optional component (C) to obtain the composition according to the invention. The value of the MFI of the heterophasic propylene copolymer (MFI heterophasic) refers to the final MFI of the heterophasic propylene copolymer. To exemplify this:

In case the heterophasic propylene copolymer is not subjected to vis-breaking or shifting by melt-mixing with a peroxide, the MFIheterophasic is the original MFI value of the heterophasic propylene copolymer. In case the heterophasic propylene copolymer is subjected to vis-breaking or shifting by melt-mixing with a peroxide, the MFIheterophasic is the value of the heterophasic propylene copolymer after such vis-breaking or shifting.

(B) Elastomer

The composition of the invention comprises an elastomer of ethylene and α-olefin comonomer having 4 to 8 carbon atoms. The elastomer has a density of 0.850-0.915 g/cm³. The elastomer may also sometimes be referred as a plastomer.

The α-olefin comonomer in the elastomer is preferably an acyclic monoolefin such as 1-butene, 1-pentene, 1-hexene, 1-octene, or 4-methylpentene.

Accordingly, the elastomer is preferably selected from the group consisting of ethylene-1-butene copolymer, ethylene-1-hexene copolymer, ethylene-1-octene copolymer and mixtures thereof, more preferably wherein the elastomer is selected from ethylene-1-octene copolymer.

Most preferably, the elastomer is an ethylene-1-octene copolymer.

Preferably, the density of the elastomer is at least 0.865 g/cm³ and/or at most 0.910 g/cm³. For example, the density of the elastomer is at least 0.850, for example at least 0.865, for example at least 0.88, for example at least 0.90 and/or for example at most 0.915, for example at most 0.910, for example at most 0.907, for example at most 0.906 g/cm³. More preferable the density of the elastomer is in the range from 0.88 up to an including 0.907 g/cm³, most preferably, the density of the elastomer is in the range from 0.90 up to and including 0.906 g/cm³.

Elastomers which are suitable for use in the current invention are commercially available for example under the trademark EXACT™ available from Exxon Chemical Company of Houston, Tex. or under the trademark ENGAGE™ polymers, a line of metallocene catalyzed plastomers available from Dow Chemical Company of Midland, Mich. or from Nexlene™ from SK Chemicals The elastomers may be prepared using methods known in the art, for example by using a single site catalyst, i.e., a catalyst the transition metal components of which is an organometallic compound and at least one ligand of which has a cyclopentadienyl anion structure through which such ligand bondingly coordinates to the transition metal cation. This type of catalyst is also known as "metallocene" catalyst. Metallocene catalysts are for example described in U.S. Pat. Nos. 5,017,714 and 5,324,820. The elastomer s may also be prepared using traditional types of heterogeneous multi-sited Ziegler-Natta catalysts.

Preferably, the elastomer has a melt flow index of 0.1 to 40 dg/min (ISO1133, 2.16 kg, 190° C.), for example at least 1 dg/min and/or at least 35 dg/min. More preferably, the elastomer has a melt flow index of at least 1.5 dg/min, for example of at least 2 dg/min, for example of at least 2.5 dg/min, for example of at least 3 dg/min, more preferably at least 5 dg/min, preferably at least 10 dg/min, more preferably at least 20 dg/min, measured in accordance with ISO 1133 using a 2.16 kg weight and at a temperature of 190° C. In these ranges, particularly good stress whitening property is obtained.

Preferably, the amount of ethylene in the elastomer is at least 50 mol %. More preferably, the amount of ethylene in the elastomer is at least 57 mol %, for example at least 60 mol %, at least 65 mol % or at least 70 mol %. Even more preferably, the amount of ethylene in the elastomer is at least 75 mol %. In these ranges, particularly good transparency (and low haze) is obtained. The amount of ethylene in the elastomer may typically be at most 97.5 mol %, for example at most 95 mol % or at most 90 mol %.

Preferably the amount of elastomer (B) in the composition of the invention is in the range of 1 to 10 wt % based on the total of the amount of heterophasic propylene copolymer (A) and the amount of elastomer (B), preferably in the range of 3 to 7 wt %, for example in the range of 5 to 7 wt % based on the total of the amount of heterophasic propylene copolymer (A) and the amount of elastomer (B).

(C) Optional Components

The composition according to the invention may optionally comprise at least one optional component (C). Examples of optional components (C) are peroxides and other additives. The amount of the optional component (C) is typically 0 to 30 wt % of the total of the composition.

Peroxides

In some embodiments, the composition according to the invention can be obtained by melt-mixing a peroxide with components (A) and (B). The composition obtained by the addition of a peroxide has a different (higher) MFI from the MFI of the heterophasic copolymer used in preparing the composition. This step is also known in the art as visbreaking or shifting. The term "visbreaking" is well known in the field of the invention. For example methods of visbreaking polypropylene have been disclosed in U.S. Pat. No. 4,282,076 and EP 0063654. It is also possible to first melt-mix a peroxide with component (A), which changes the melt flow index of the heterophasic propylene copolymer, and then mix with component (B).

Examples of organic peroxides are well known and include dialkyl peroxides, e.g. dicumyl peroxides, peroxyketals, peroxycarbonates, diacyl peroxides, peroxyesters and peroxydicarbonates. Specific examples of these include benzoyl peroxide, dichlorobenzoyl peroxide, dicumyl peroxide, di-tert-butyl peroxide, 2,5-dimethyl-2,5-di(peroxybenzoato)-3-hexene, 1,4-bis(tert-butylperoxyisopropyl)benzene, lauroyl peroxide, tert-butyl peracetate, α,α'-bis(tert-butylperoxy)diisopropylbenzene (Luperco® 802), 2,5-dimethyl-2,5-di(tert-butylperoxy)-3-hexene, 2,5-dimethyl-2,5-di(tert-butylperoxy)-hexane, tert-butyl perbenzoate, tert-butyl perphenylacetate, tert-butyl per-sec-octoate, tert-butyl perpivalate, cumyl perpivalate and 3,6,9-Triethyl-3,6,9,-trimethyl-1,4,7-triperoxonane.

It can easily be determined by the person skilled in the art through routine experimentation how much peroxide should be used to obtain a composition having the desired melt flow index. This also depends on the half-life of the peroxide and on the conditions used for the melt-mixing, which in turn depend on the exact composition of the heterophasic propylene copolymer.

When a peroxide is used, the amount of peroxide will typically lie in the range of 0.02 to 0.5 wt % based on the heterophasic propylene copolymer.

In some embodiments, the composition according to the invention is prepared without using a peroxide.

Additives

The composition according to the invention may further comprise additives. The additives may include nucleating agents, stabilisers, e.g. heat stabilisers, anti-oxidants, UV stabilizers; colorants, like pigments and dyes; clarifiers; surface tension modifiers; lubricants; flame-retardants; mould-release agents; flow improving agents; plasticizers; anti-static agents; blowing agents; inorganic fillers and reinforcing agents.

Clarifiers (also known as clarifying agents) are known to the person skilled in the art and are commercially available from for example Milliken, Examples of suitable clarifiers include but are not limited to sorbitol-based clarifiers, for example a dibenzilidene sorbitol optionally substituted with one or more (for example 1 to 3) alkyl groups having for instance 1-10 C-atoms. Commercial examples of clarifiers are 1,3:2,4-bis(p-methylbenzilidene) sorbitol (MDBS) (for instance Millad 3940; Milliken), 1,3:2,4-bis(3,4-dimethylbenzilidene) sorbitol (for instance Millad 3988; Milliken), (for instance Millad NX8000; Milliken or Sunwise Chemical Co.) or 1,3:2,4-bis(p-ethylbenzylidene)-sorbitol (for instance NC-4; Mitsui).

The amount of clarifier is not critical, but may for example, be chosen in the range from 100 to 5000 ppm, for example in the range from 500 to 3000 ppm based on the total composition.

The skilled person can readily select any suitable combination of additives and additive amounts without undue experimentation. The amount of the additives depends on their type and function and typically is of from 0 to about 30 wt %. The amount of the additives may e.g. be from about 1 to about 20 wt %; from about 2 to about 10 wt % or of from 3 to about 5 wt % based on the total composition.

The sum of all components added in the process of the invention to form the composition comprising (A) the heterophasic propylene copolymer, (B) the block copolymer and (C) the optional components should add up to 100% by weight.

Preferably, the total of components (A) and (B) is at least 70 wt %, at least 80 wt %, at least 90 wt %, at least 95 wt %, at least 97 wt %, at least 98 wt %, at least 99 wt %, at least 99.5 wt %, at least 99.9 wt % or 100 wt % of the total composition.

The invention further relates to a composition comprising no or little amount of an inorganic filler, for example talc. The amount of the inorganic filler in the composition according to the invention may for example be at most 0.5 wt %, at most 0.1 wt %, for example at most 0.05 wt %, for example at most 0.01 wt %, for example at most 0.005 wt % or 0 wt %.

The invention further relates to a composition comprising no or little amount of a polypropylene homopolymer as an additional component to components (A) and (B). The amount of the additional polypropylene homopolymer in the composition according to the invention may be at most 5 wt %, at most 3 wt %, at most 1 wt %, at most 0.5 wt %, at most 0.1 wt % or 0 wt %.

Process

The composition of the invention may be obtained by a process comprising melt-mixing (A) the heterophasic copolymer, (B) the elastomer and (C) the optional component by using any suitable means. Accordingly, the invention further relates to a process for the preparation of the composition according to the invention comprising melt mixing (A) and (B) and optionally (C).

The melt-mixing of the components may be done in any order. For example, (A) the heterophasic copolymer and (C) the optional component may be melt-mixed before melt-mixing with (B) the elastomer. A composition of (A) the heterophasic copolymer and (C) the optional component for example in the form of a pellet may first be obtained and then be melt-mixed with (B) the elastomer. Alternatively, components (A) and (B) are melt-mixed, or components (A), (B) and (C) are melt-mixed.

Preferably, the composition of the invention is made in a form that allows easy processing into a shaped article in a subsequent step, like in pellet or granular form. The composition can be a mixture of different particles or pellets; like a blend of the heterophasic copolymer and a masterbatch of additives. Preferably, the composition of the invention is in pellet or granular form as obtained by mixing all components in an apparatus like an extruder; the advantage being a composition with homogeneous and well-defined concentrations of the additives.

With melt-mixing is meant that the components (B) and/or (C) are mixed with the heterophasic propylene copolymer at a temperature that exceeds the melting point of the heterophasic propylene copolymer. Melt-mixing may be done using techniques known to the skilled person, for example in an extruder. Generally, in the process of the invention, melt-mixing is performed at a temperature in the range from 200-300° C.

Suitable conditions for melt-mixing, such as temperature, pressure, amount of shear, screw speed and screw design when an extruder is used are known to the skilled person.

When using an extruder, a conventional extruder such as a twin-screw extruder may be used. The temperature can vary through the different zones of the extruder as required. For example, the temperature may vary from 100° C. in the feed zone to 300° C. at the die. Preferably, the temperature in the extruder varies from 200 to 265° C.; lower temperatures may impede reactions between the peroxide and an optional co-agent, for example polyfunctional monomers such as BDDMA and, as a consequence, compositions with the desired melt flow index may not be obtained; too high temperatures may induce undesired degradation processes, which may for example result in compositions having poor mechanical properties. Likewise, the screw speed of the extruder may be varied as needed. Typical screw speed are in the range from about 100 rpm to about 400 rpm.

Properties of (A) or (A) and (C)

Preferably, the heterophasic propylene copolymer and/or a composition consisting of the heterophasic propylene copolymer and additives has a relatively high transparency. Transparency as used in here is defined as transmission minus Haze. The determination of the haze and transmission values is carried out in accordance with the standard ASTM D1003 using as test specimens injection moulded plates having an edge length of 65*65 mm and a thickness of 1.6 mm. Preferably, the transparency is higher than 8%, preferably higher than 10%, more preferably higher than 15%, for example higher than 20%, for example higher than 25%, for example higher than 35%, for example higher than 40%.

The heterophasic propylene copolymer and/or a composition consisting of the heterophasic propylene copolymer and additives may have a tensile modulus as measured according to ISO 527/1A with samples in the parallel orientation of injection moulding. Preferably, the tensile modulus is at least 600 MPa, more preferably at least 700, more preferably at least 800, more preferably at least 900 MPa, The heterophasic propylene copolymer and/or a composition consisting of the heterophasic propylene copolymer and additives may have a gloss as determined according to ISO 2813 and DIN67530 at a measurement angle of 20°. Preferably, the gloss is at least 50, at least 55 or at least 60. The measurement scale of gloss, Gloss Units (GU), of a glossmeter is a scaling based on a highly polished reference black glass standard with a defined refractive index having a specular reflectance of 100 GU at the specified angle. This standard is used to establish an upper point calibration of 100 with the lower end point established at 0 on a perfectly matte surface. The samples used for this test may be obtained by injection molding ISO 37/2 on the machine Arburg 60T, mould: 1-1-1-108, with geometry 65*65*3.2 mm. Gloss is the amount of light reflected in a certain direction by a surface of a sample made from the composition.

The heterophasic propylene copolymer and/or a composition consisting of the heterophasic propylene copolymer and additives may have an Izod notched impact (0° C., parallel), measured in accordance with ISO 180/4A of at least 0.5 KJ/m$^2$, preferably at least 1.0 KJ/m$^2$, more preferably at least 2.0 KJ/m$^2$, more preferably at least 3.0 kJ/m$^2$, more preferably at least 5.0 kJ/m$^2$. The heterophasic propylene copolymer may have an Izod notched impact (23° C., parallel), measured in accordance with ISO 180/4A of at least 0.5 KJ/m$^2$, preferably at least 1.0 KJ/m$^2$, more preferably at least 2.0 KJ/m$^2$, more preferably at least 3.5 kJ/m$^2$, more preferably at least 5.0 kJ/m$^2$, more preferably at least 9.0 kJ/m$^2$.

Preferably, the propylene-based matrix consists of a propylene homopolymer, the α-olefin copolymer in the dispersed ethylene-α-olefin copolymer is propylene and the amount of ethylene in the ethylene-α-olefin copolymer is in the range of 10-45 wt %, preferably 15-40 wt %, more preferably 15-30 wt %, more preferably 15-25 wt %.

Rubber content and RCC$_2$ (amount of ethylene in ethylene-α-olefin copolymer) is measured with NMR and IR spectroscopy, which is calibrated using NMR according to known procedures.

Properties of Composition of (A) and (B) or of (A), (B) and (C)

Preferably, an article made from the composition according to the invention consisting of (A) and (B) or consisting of (A), (B) and (C) has the following properties.

Preferably, the properties of the composition can be represented in the following equation:

$$\left[1 + \frac{SW_c}{SW_m} * \left(\frac{I_m}{I_c}\right)^{1/3}\right]\left[\left(\frac{H_c}{H_m}\right)^3 / C_2\right] < 3 \quad \text{(equation 1)}$$

wherein C$_2$ is the amount of ethylene (mol %) in the elastomer wherein the spot whiteness of the composition (SW$_c$) and of the heterophasic propylene copolymer (SW$_m$) are determined by creating a white spot on a test piece with dimension 65*65*3.2 mm made by injection according to ISO 37/2 by dropping a ball of 500 grams from a height of 230 mm according to PV3905, taking a photo of the white spot, calculating a spot size of the white spot in the photo, wherein the spot size is defined as the size of the area which has 99.5% of the whiteness of the photo and calculating the spot whiteness by dividing a total whiteness of the white spot by the spot size, wherein the total whiteness of the white spot is 99.5% of the whiteness of the photo; and wherein the haze of the composition (H$_c$) and of the heterophasic propylene copolymer (H$_m$) are determined according to ASTM D1003A.

Wherein the room temperature impact of the composition (I$_c$) and of the heterophasic propylene copolymer (I$_m$) are determined according to ISO 180 4A The amount of ethylene in the elastomer can be determined using $^{13}$C NMR.

A better (lower) spot whiteness, a better (higher) impact strength and a better (lower) haze leads to a lower value of this equation.

Preferably, $$\left[1 + \frac{SW_c}{SW_m} * \left(\frac{I_m}{I_c}\right)^{1/3}\right]^{\left[\left(\frac{H_c}{H_m}\right)^3/c_2\right]}$$

is at most 2.5, more preferably at most 2.0, more preferably at most 1.5.

Further Aspects

The composition according to the invention may then be processed by any conventional technique known in the art into an article. Suitable examples of processing techniques wherein the composition according to the invention may be used include injection moulding, injection stretch blow moulding, compression moulding, extrusion and extrusion compression moulding, sheet extrusion, thermoforming or thin-walled injection moulding.

The invention further relates to an article comprising the composition according to the invention. Injection moulding is widely used to produce articles such as for example caps and closures, batteries, pails, containers, automotive exterior parts like bumpers, automotive interior parts like instrument panels, or automotive parts under the bonnet. Extrusion is for example widely used to produce articles, such as rods, sheets, films and pipes. Thin wall injection moulding may for example be used to make thin wall packaging.

Preferably, the article according to the invention is consumer appliances such as housings for household appliances, electrical appliance and garden power tools, or thin wall packaging, caps and closures or containers and pails.

The invention further relates to the use of the article comprising the composition according to the invention for consumer appliances such as housings for household appliances, electrical appliance and garden power tools, or thin wall packaging, caps and closures or containers and pails.

Although the invention has been described in detail for purposes of illustration, it is understood that such detail is solely for that purpose and variations can be made therein by those skilled in the art without departing from the spirit and scope of the invention as defined in the claims.

It is further noted that the invention relates to all possible combinations of features described herein, preferred in particular are those combinations of features that are present in the claims. It will therefore be appreciated that all combinations of features relating to the composition according to the invention; all combinations of features relating to the process according to the invention and all combinations of features relating to the composition according to the invention and features relating to the process according to the invention are described herein.

It is further noted that the term 'comprising' does not exclude the presence of other elements. However, it is also to be understood that a description on a product/composition comprising certain components also discloses a product/composition consisting of these components. The product/composition consisting of these components may be advantageous in that it offers a simpler, more economical process for the preparation of the product/composition. Similarly, it is also to be understood that a description on a process comprising certain steps also discloses a process consisting of these steps. The process consisting of these steps may be advantageous in that it offers a simpler, more economical process.

The invention is now elucidated by way of the following examples, without however being limited thereto.

EXAMPLES

Heterophasic Propylene Copolymer

Two grades of pellets from SABIC comprising heterophasic propylene copolymer were used: CPC1 and CPC2. Both of CPC1 and CPC2 have a density of 0.905 g/cm$^3$. The heterophasic propylene copolymers CPC1 and CPC2 comprise a matrix phase of a propylene homopolymer and 25 wt % of a dispersed phase of ethylene-propylene copolymer (RC=25 wt %). The ethylene content in the dispersed phase (RCC2) is 20%. The ethylene content in the heterophasic propylene copolymer is 5 wt %. The MFI of CPC1 is 4 dg/min at 230° C./2.16 kg. The MFI of CPC2 is 33 dg/min at 230° C./2.16 kg.

CPC1 contains 5100 ppm of additives (anti-static agents, clarifiers, antioxidants and acid scavengers).

CPC2 was obtained by shifting CPC1 with 1000 ppm peroxide.

Elastomer Comprising C2-C8 Structure

Elastomers sold under the Engage™ trademark commercially available from DOW were used, as summarized in Table 1.

TABLE 1

| Engage ™ Grade | Ethylene (mol %) | Density (g/cm3) | MFI (g/10 min, 190° C./ 2.16 kg) |
|---|---|---|---|
| 8200 | 63 | 0.87 | 5 |
| 8407 | 60 | 0.87 | 30 |
| 8842 | 55 | 0.857 | 1 |
| 8003 | 70 | 0.885 | 1 |
| 8402 | 79 | 0.902 | 30 |
| 8450 | 80 | 0.902 | 2 |

Preparation

Pellets were made by compounding a heterophasic propylene copolymer and an elastomer as summarized in Tables 2-1 and 2-2 in a Kraus Maffei Berstorff twin screw extruder ZSK25, equipped with a shift screw, at 184 RPM and a throughput of 13 kg/hour. Tables 2-1 and 2-2 summarize the results wherein the heterophasic propylene copolymer was CPC1 and CPC2, respectively.

Various properties were measured as summarized in Tables 2-1 and 2-2.

TABLE 2-1

| | Sample name | 1 (comp) | 2 | 3 | 4 | 5 | 6 | 7 |
|---|---|---|---|---|---|---|---|---|
| Sample | Heterophasic propylene copolymer | | | | CPC1 | | | |
| | C2-C8 elastomer | | 5 Engage 8200 | 5 Engage 8407 | 5 Engage 8842 | 5 Engage 8003 | 5 Engage 8402 | 5 Engage 8450 |
| | wt % in composition | | | | | | | |

TABLE 2-1-continued

| | Sample name | 1 (comp) | 2 | 3 | 4 | 5 | 6 | 7 |
|---|---|---|---|---|---|---|---|---|
| Optical | Haze (%) | 44.3 | 58.3 | 43.2 | 63.4 | 46.9 | 36.4 | 37.7 |
| | Transmittance (%) | 79.6 | 78.5 | 78.2 | 68.4 | 79.2 | 82.3 | 81.2 |
| | Transparency (%) | 35.3 | 20.2 | 35.0 | 5.0 | 32.3 | 45.9 | 43.5 |
| | Gloss 20° | 76.4 | 78.6 | 74.7 | 73.2 | 74.2 | 77.1 | 75.4 |
| | Gloss 60° | 87.6 | 88.2 | 87.9 | 86.4 | 86.2 | 88.9 | 87.9 |
| | Gloss 85° | 97.8 | 97.5 | 96.1 | 98.2 | 97.9 | 97.1 | 95.9 |
| | White spot size ($mm^2$) | 50.0 | 15.0 | 21.0 | 36.0 | 28.0 | 19.0 | 22.0 |
| | Spot whiteness ($mm^2$) | 40.1 | 18.9 | 21.6 | 22.7 | 24.9 | 22.6 | 24.1 |
| Mechanical | Izod (II) 0° C. ($kJ/m^2$) | 1.7 | 3.1 | 4.1 | 5.2 | 4.3 | 2.8 | 2.8 |
| | Izod (II) 23° C. ($kJ/m^2$) | 39.1 | 48.3 | 54.7 | 57.5 | 50.7 | 46.9 | 48.8 |
| | Tensile modulus (II) ($N/mm^2$) | 1100.4 | 1033.3 | 1058.5 | 1056.6 | 1055.0 | 1047.7 | 1076.1 |
| | Flexural modulus (II) ($N/mm^2$) | 1156.0 | 1063.0 | 1077.0 | 1046.0 | 1077.0 | 1084.0 | 1086.0 |
| MFI | MFI (230° C., 2.16 kg) | 4.8 | 4.8 | 4.9 | 4.9 | 4.9 | 5.4 | 5.4 |
| Outcome of equation 1 | | | 3.7 | 1.8 | 8.6 | 2.1 | 1.3 | 1.4 |

The effects of addition of various types of elastomers to a heterophasic propylene copolymer can be understood as below.

Lower values of the spot size and whiteness together indicate less stress whitening. Lower value of the spot size indicates that the failure of the material is limited to a smaller area. Lower value of the whiteness indicates lower colour visibility of the failure of the material.

From comparison of sample 1 (comparative experiment), 2, 3, 4, 5, 6 and 7, it can be understood that the addition of an elastomer leads to a large improvement in the stress whitening property and impact strength while maintaining acceptable tensile modulus and flexural modulus. The addition of an elastomer having a relatively high MFI (2, 3, 6) leads to a particularly good stress whitening property. The addition of an elastomer having a relative high ethylene content has a high transparency (6, 7).

As can be seen from the above table, for compositions according to the invention, it is preferred that the outcome of equation 1 is less than 3.0, more preferably less than 2.5, most preferably less than 2.0 as this gives the best balance between stress whitening, impact strength and haze.

TABLE 2-2

| | Sample name | 8 | 9 | 10 | 11 | 12 | 13 | 14 |
|---|---|---|---|---|---|---|---|---|
| Sample | Heterophasic propylene copolymer | | | | CPC2 | | | |
| | C2-C8 elastomer | | 5 Engage 8200 | 5 Engage 8407 | 5 Engage 8842 | 5 Engage 8003 | 5 Engage 8402 | 5 Engage 8450 |
| | wt % in composition | | | | | | | |
| Optical | Haze (%) | 66.6 | 75.9 | 57.5 | 97.8 | 82.1 | 37.8 | 43.8 |
| | Transmittance (%) | 80.3 | 79.9 | 77.6 | 77.2 | 81.2 | 82.5 | 81.4 |
| | Transparency (%) | 13.7 | 4.0 | 20.1 | −20.6 | −0.8 | 44.6 | 37.6 |
| | Gloss 20° | 61.0 | 62.1 | 61.4 | 59.8 | 65.3 | 70.5 | 73.8 |
| | Gloss 60° | 83.3 | 85.9 | 86.3 | 85.8 | 80.6 | 87.1 | 86.0 |
| | Gloss 85° | 97.4 | 98.0 | 92.2 | 89.8 | 98.1 | 97.9 | 98.2 |
| | White spot size ($mm^2$) | 224.0 | 222.0 | 129.0 | 273.0 | 316.0 | 84.0 | 222.0 |
| | Spot whiteness ($mm^2$) | 55.3 | 51.5 | 39.2 | 52.5 | 60.9 | 43.3 | 58.3 |
| | Izod (II) 0° C. ($kJ/m^2$) | 2.2 | 3.5 | 4.2 | 4.4 | 3.2 | 3.2 | 3.1 |
| | Izod (II) 23° C. ($kJ/m^2$) | 5.6 | 8.1 | 16.5 | 8.0 | 6.1 | 8.7 | 6.1 |

TABLE 2-2-continued

| Sample name | | 8 | 9 | 10 | 11 | 12 | 13 | 14 |
|---|---|---|---|---|---|---|---|---|
| Mechanical | Tensile modulus (II) (N/mm$^2$) | 1042.9 | 976.9 | 1019.0 | 1020.1 | 1025.2 | 1041.8 | 1038.5 |
| | Flexural modulus (II) (N/mm$^2$) | 1068.0 | 1010.0 | 1052.0 | 1027.0 | 1045.0 | 1055.0 | 1045.0 |
| MFI | MFI (230° C., 2.16 kg) | 31.5 | 30.0 | 31.1 | 27.2 | 26.5 | 30.2 | 28.6 |
| Outcome of equation 1 | | | 4.1 | 1.5 | 33.4 | 7.0 | 1.1 | 1.3 |

From comparison of samples 8 (comparative experiment), 9, 10, 11, 12, 13 and 14, it can be understood that the addition of an elastomer leads to an improvement in impact strength while maintaining acceptable stress whitening property, tensile modulus and flexural modulus.

The addition of an elastomer having a relatively high MFI (10, 13) leads to a particularly good stress whitening property.

As can be seen from the above table, for compositions according to the invention, it is preferred that the outcome of equation 1 is less than 3.0, more preferably less than 2.0, most preferably less than 1.5 as this gives the best balance between stress whitening, impact strength and haze.

The properties were measured as follows:

Transparency

Transparency is defined as Transmission minus Haze. The determination of the Haze and Transmission values was carried out in accordance with the standard ASTM D1003A. The test specimens are small plaque 65*65*1.6 mm with hinge, injected in machine Arburg 60T/DEMAG 60T, mould: 1-1-2-110.

Gloss

Gloss is the amount of light reflected in a certain direction by a surface of a sample made from the composition. The gloss was determined according to ISO 2813 and DIN67530 at a measurement angle of 20°. The samples used for this test are obtained by injection molding ISO 37/2 on the machine Arburg 60T, mould: 1-1-1-108, with geometry 65*65*3.2 mm.

Stress Whitening (Spot Size and Whitening)

Stress whitening is the appearance of a white area on an object when the object is stressed by a blushing operation. The appearance of the white area indicates that there is an onset of failure of the corresponding material.

The blushing on the samples was created according to PV3905, by dropping a ball of 500 grams from a height of 230 mm on a test piece with dimension 65*65*3.2 mm injected on the machine Arburg 60T, mould: 1-1-1-108, by ISO 37/2.

Photos of these test pieces were taken with a SLR digital camera (Canon 6D; 100 macro lens including an extender) with fixed settings and illumination conditions such that no under or over exposure is present.

Image analysis of the photos was done using a Matlab Graphical Interface (GUI) in order to determine the values of two parameters "spot size" and "spot whiteness". Parameter "spot size" indicates the dimensional visibility of the white area and "spot whiteness" indicates the colour visibility of the white area.

The spot size was determined as follows:

The total whiteness of the whole photo is calculated as the sum of the whiteness of each pixel in the whole photo. The whiteness of the intrinsic material is defined as 0. Each pixel constituting the sample has a whiteness of 0-255. The spot size is defined as the size of the area which has 99.5% of the whiteness of the whole photo.

The spot whiteness was determined as follows:

The total whiteness of the white spot in the photo is 99.5% of the whiteness of the whole photo. The spot whiteness is calculated by dividing the total whiteness of the white spot by the spot size.

Impact Strength

For purpose of the present invention, impact strength was measured by Izod test according to ISO 180 4A. Samples were obtained by cutting injected plaques (ISO 37/2 on the machine Arburg 60T, mould: 1-1-1-108) into 65*12.7*3.2 mm in the parallel orientation of moulding with 45° notch, radius 0.25 mm. The test temperatures were 0° C. and 23° C.

Stiffness (Tensile Modulus)

For purpose of the present invention, stiffness was determined by measuring the tensile modulus according to ISO 527/1A with samples in the parallel orientation of injection moulding. The test specimens were injected on machine Arburg 60T/DEMAG 60T, mould: 1-1-1-102/122, single side injection, Dimensions: 150*10*4 mm.

Melt Flow Index

The flow of the composition obtained was determined by measuring the melt flow index according to ISO1133 at 230° C., 2.16 Kg.

The invention claimed is:

1. A composition comprising:
(A) a heterophasic propylene copolymer, wherein the heterophasic propylene copolymer (A) consists of
  (a) a propylene-based matrix,
    wherein the propylene-based matrix consists of a propylene homopolymer and
    wherein the propylene-based matrix is present in an amount of 60 to 95 wt % based on the total heterophasic propylene copolymer (A) and
    wherein the propylene-based matrix has a melt flow index of at least 0.1 dg/min and at most 45 dg/min, measured according to ISO1133 (2.16 kg/230° C.) and
  (b) a dispersed ethylene-α-olefin copolymer,
    wherein the dispersed ethylene-α-olefin copolymer is an ethylene-propylene copolymer, wherein the ethylene-α olefin copolymer is present in an amount of 40 to 5 wt % based on the total heterophasic propylene copolymer (A) and
    wherein the sum of the total amount of propylene-based matrix and total amount of dispersed ethylene-α-olefin copolymer is 100 wt % wherein the amount of ethylene in the ethylene-α-olefin copolymer of the heterophasic propylene copolymer (A) is from 10 up to and including 45 wt % (RCC2);
(B) an elastomer of ethylene and α-olefin comonomer having 4 to 8 carbon atoms, wherein the elastomer (B) has a density in the range from 0.88 up to and including 0.907 g/cm$^3$ and a melt flow rate of at least 20 dg/min measured in accordance with ISO 1133 using a 2.16 kg weight and at a temperature of 190° C.,
wherein the amount of ethylene in the elastomer (B) is at least 50 mol %; and
(C) 0.02 to 0.5 wt % of a peroxide based on the heterophasic propylene copolymer (A).

2. The composition according to claim 1, wherein the amount of elastomer (B) is in the range of 1 to 10 wt % based on the total of the amount of heterophasic propylene copolymer (A) and the amount of elastomer (B).

3. The composition of claim 2, wherein the amount of elastomer (B) is in the range of 5 to 7 wt %, based on the total of the amount of heterophasic propylene copolymer (A) and the amount of elastomer (B).

4. The composition according to claim 1, wherein the composition further comprises a clarifying agent in an amount of 1000 to 5000 ppm based on the total composition and/or wherein the composition comprises no or little amount of an inorganic filler.

5. The composition according to claim 1, wherein the amount of ethylene in the elastomer (B) is at least 65 mol %.

6. The composition according to claim 5, wherein the amount of ethylene in the elastomer (B) is at least 70 mol %.

7. The composition according to claim 1, wherein the elastomer (B) is selected from the group consisting of ethylene-1-butene copolymer, ethylene-1-hexene copolymer, ethylene-1-octene copolymer and mixtures thereof.

8. The composition according to claim 1, wherein the elastomer (B) is an ethylene-1-octene copolymer.

9. A process for the preparation of the composition according to claim 1, comprising melt mixing of the heterophasic propylene copolymer (A) and the elastomer (B).

10. An article comprising the composition of claim 1.

11. The article according to claim 10, wherein the article is a consumer appliance.

12. The composition of claim 1, wherein the density of the elastomer (B) is in the range from 0.90 up to and including 0.906 g/cm$^3$ and wherein the amount of ethylene in the elastomer (B) is at least 70 mol %.

13. The composition according to claim 1, wherein
the amount of ethylene in the elastomer (B) is at least 75 mol %.

14. The composition of claim 1, wherein the amount of ethylene in the ethylene-α-olefin copolymer of the heterophasic propylene copolymer (A) is from 10 up to and including 25 wt % (RCC2).

15. The composition of claim 1, wherein the amount of ethylene in the ethylene-α-olefin copolymer of the heterophasic propylene copolymer (A) is from 10 up to and including 22 wt % (RCC2).

16. The composition according to claim 1, wherein the amount of ethylene in the ethylene-α-olefin copolymer of the heterophasic propylene copolymer (A) is from 10 up to and including 30 wt % (RCC2).

17. The composition of claim 1, wherein the total of components (A) and (B) is at least 90 wt % of the total composition.

18. The composition according to claim 1, A composition comprising:
(A) a heterophasic propylene copolymer, wherein the heterophasic propylene copolymer (A) consists of
(a) a propylene-based matrix,
wherein the propylene-based matrix consists of a propylene homopolymer and
wherein the propylene-based matrix is present in an amount of 60 to 95 wt % based on the total heterophasic propylene copolymer (A) and
wherein the propylene-based matrix has a melt flow index of at least 0.1 dg/min and at most 45 dg/min, measured according to ISO1133 (2.16 kg/230° C.) and
(b) a dispersed ethylene-α-olefin copolymer,
wherein the dispersed ethylene-α-olefin copolymer is an ethylene-propylene copolymer, wherein the ethylene-α olefin copolymer is present in an amount of 40 to 5 wt % based on the total heterophasic propylene copolymer (A) and
wherein the sum of the total amount of propylene-based matrix and total amount of dispersed ethylene-α-olefin copolymer is 100 wt %
wherein the amount of ethylene in the ethylene-α-olefin copolymer of the heterophasic propylene copolymer (A) is from 10 up to and including 30 wt % (RCC2); and
(B) an elastomer of ethylene and α-olefin comonomer having 4 to 8 carbon atoms, wherein the elastomer (B) has a density in the range from 0.88 up to and including 0.907 g/cm$^3$,
wherein the amount of ethylene in the elastomer (B) is at least 50 mol %; and
wherein the composition has
a tensile modulus in a range of 976.9 MPa to 1076.1 MPa, measured in accordance with ISO 527/1A with samples in the parallel orientation of injection moulding, and
an Izod notched impact (0° C., parallel) in a range of 2.8 KJ/m$^2$ to 5.2 KJ/m$^2$, measured in accordance with ISO 180/4A.

* * * * *